United States Patent
Matsui et al.

(10) Patent No.: US 9,417,485 B2
(45) Date of Patent: *Aug. 16, 2016

(54) LIQUID CRYSTAL DISPLAY DEVICE

(71) Applicants: Japan Display Inc., Tokyo (JP); Panasonic Liquid Crystal Display Co., Ltd., Hyogo-ken (JP)

(72) Inventors: Chikae Matsui, Mobara (JP); Hidehiro Sonoda, Mobara (JP); Noboru Kunimatsu, Chiba (JP)

(73) Assignees: Japan Display Inc., Tokyo (JP); Panasonic Liquid Crystal Display Co., LTD, Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,519

(22) Filed: Feb. 18, 2015

(65) Prior Publication Data

US 2015/0168755 A1 Jun. 18, 2015

Related U.S. Application Data

(63) Continuation of application No. 13/852,565, filed on Mar. 28, 2013, now Pat. No. 8,994,908, which is a continuation of application No. 12/832,221, filed on Jul. 8, 2010, now Pat. No. 8,427,624.

(30) Foreign Application Priority Data

Jul. 8, 2009 (JP) ................ 2009-161616

(51) Int. Cl.
*G02F 1/1339* (2006.01)
*G02F 1/1341* (2006.01)
*G02F 1/1337* (2006.01)
*G02F 1/1343* (2006.01)
(Continued)

(52) U.S. Cl.
CPC ............ *G02F 1/1339* (2013.01); *G02F 1/1337* (2013.01); *G02F 1/1368* (2013.01); *G02F 1/133512* (2013.01); *G02F 1/133514* (2013.01); *G02F 1/134363* (2013.01); *G02F 2001/133519* (2013.01)

(58) Field of Classification Search
CPC ............................. G02F 1/1339; G02F 1/1341
See application file for complete search history.

(56) References Cited

U.S. PATENT DOCUMENTS

| 5,739,888 A * | 4/1998 | Ogura et al. .................. 349/153 |
| 8,120,743 B2 | 2/2012 | Katsumura |
| 2004/0046918 A1 * | 3/2004 | Song ............................. 349/141 |

(Continued)

FOREIGN PATENT DOCUMENTS

| JP | H10-090693 A | 8/1998 |
| JP | H11-174487 A | 7/1999 |

(Continued)

*Primary Examiner* — Jessica M Merlin
(74) *Attorney, Agent, or Firm* — Typha IP LLC

(57) ABSTRACT

In a liquid crystal display device, a light shielding film, a color filter, an overcoat film, and an alignment film are formed in this order on a counter substrate. However, the alignment film is not formed in a seal portion. When the alignment film is subjected to photo-alignment with ultraviolet radiation, a portion of the overcoat film not covered with the alignment film is degraded by ultraviolet radiation. In order to prevent moisture penetrating from the degraded overcoat film from reaching the light shielding film to thereby alter the light shielding film and from causing the peeling of the light shielding film, the color filter is disposed below the overcoat film to block the moisture.

13 Claims, 11 Drawing Sheets

(51) Int. Cl.
*G02F 1/1368* (2006.01)
*G02F 1/1335* (2006.01)

(56) References Cited

U.S. PATENT DOCUMENTS

2005/0271833 A1  12/2005  Matsumori
2006/0290838 A1*  12/2006  Ro et al. .......... 349/60
2008/0062374 A1*  3/2008  Katsumura et al. .......... 349/153

FOREIGN PATENT DOCUMENTS

| | | |
|---|---|---|
| JP | H11-183936 A | 7/1999 |
| JP | 2000-137229 A | 5/2000 |
| JP | 2001-174828 A | 6/2001 |
| JP | 2003-005195 A | 1/2003 |
| JP | 2004-212745 A | 7/2004 |
| JP | 2005-351924 A | 12/2005 |
| JP | 2008-90294 A | 4/2008 |

* cited by examiner

US 9,417,485 B2

LIQUID CRYSTAL DISPLAY DEVICE

CLAIM OF PRIORITY

This application is a continuation of U.S. application Ser. No. 13/852,565, filed on Mar. 28, 2013, which application is a continuation of U.S. application Ser. No. 12/832,221, filed Jul. 8, 2010 and which application claims priority from Japanese application serial No. 2009-161616 filed on Jul. 8, 2009, the content of which is hereby incorporated by reference into this application.

BACKGROUND OF THE INVENTION

1. Field of the Invention

The present invention relates to a display device and more particularly to an in-plane switching (IPS) type liquid crystal display device improved in reliability of a seal portion.

2. Description of the Related Art

A liquid crystal display device includes a TFT substrate on which pixel electrodes, thin film transistors (TFTs), and the like are formed in a matrix, a counter substrate which is disposed to face the TFT substrate and on which color filters and the like are formed at positions corresponding to the pixel electrodes of the TFT substrate, and liquid crystal interposed between the TFT substrate and the counter substrate. An image is formed by controlling the transmittance ratio of light through liquid crystal molecules for each pixel.

The liquid crystal display device is flat and light in weight, and therefore the application of liquid crystal display device has expanded in various fields from large display devices such as TVs to small display devices such as mobile phones or digital still cameras (DSCs). On the other hand, the liquid crystal display device has a problem of viewing angle characteristics. Viewing angle characteristics refer to a phenomenon where brightness varies or chromaticity varies between when a screen is seen from the front and when the screen is seen from a diagonal direction. The IPS type, in which the liquid crystal molecules are moved by a horizontal direction electric field, has excellent viewing angle characteristics.

In the IPS type, it is not necessary to form a pretilt angle for liquid crystal molecules in the vicinity of an alignment film. Therefore, an alignment axis for the alignment film can be formed not by a rubbing method but by a photo-alignment method. The photo-alignment has such an advantage that it does not cause static electricity compared to the rubbing method, for example.

The photo-alignment imparts anisotropy to an alignment film with the irradiation of polarized ultraviolet radiation so that liquid crystal molecules are aligned in a specific direction with respect to the alignment film. JP-A-2005-351924 describes a technique relating to the photo-alignment described above.

The photo-alignment is performed by irradiating an alignment film made of a polymer with ultraviolet radiation polarized in a specific direction. For example, when the polymer formed in a network is irradiated with polarized ultraviolet radiation, the polymer in a specific direction with respect to the polarized direction of ultraviolet radiation is damaged. This can form anisotropy for the alignment film for aligning liquid crystal molecules. There is no problem when only the alignment film is irradiated with polarized ultraviolet radiation for photo-alignment. However, when a portion other than the alignment film is irradiated, the irradiated portion is degraded by the ultraviolet radiation, causing problems.

IPS type liquid crystal display devices have been used for small liquid crystal display devices. Manufacturing small liquid crystal display devices one by one is inefficient. Therefore, a number of liquid crystal display devices are formed on a mother substrate to simultaneously manufacture a number of liquid crystal display devices.

FIG. 13 shows an example where 35 small liquid crystal display cells 1 are prepared on a mother substrate. A mother TFT substrate 1000 on which a number of TFT substrates 100 each having TFTs and pixel electrodes are formed, and a mother counter substrate 2000 on which a number of counter substrates 200 each having color filters and the like formed thereon are formed are aligned to each other. The mother TFT substrate 1000 and the mother counter substrate 2000 are bonded together with sealing materials 15 and a mother substrate sealing material 151. In FIG. 13, each of hatched rectangles surrounded by the sealing material 15 indicates a range where an alignment film 113 is formed.

Small liquid crystal display devices are required to be thin. For example, the TFT substrate and the counter substrate each has a thickness of about 0.2 mm. However, such thin glass does not exist as a standard product. Moreover, such a thin glass substrate cannot undergo the process at present. Accordingly, in a state of the mother counter substrate 2000 or the mother TFT substrate 1000, glass having a thickness of about 0.5 mm is used, and after the mother counter substrate 2000 and the mother TFT substrate 1000 are aligned to each other to form a mother substrate, the outer surface of the mother counter substrate 2000 or the mother TFT substrate 1000 is polished.

Polishing is often carried out with a combination of mechanical polishing and chemical polishing. In both mechanical polishing and chemical polishing, when abrasive enters the inside of the mother substrate, the liquid crystal cells 1 inside of the mother substrate become defective. Therefore, the inside of the mother substrate is protected by the mother substrate sealing material 151. The mother substrate sealing material 151 formed at the periphery of the mother substrate is sealed with a mother-substrate end-sealing material 161. The mother substrate shown in FIG. 13 is separated into individual liquid crystal cells after polishing.

FIG. 14 shows the mother counter substrate 2000 constituting the mother substrate shown in FIG. 13, in which 35 counter substrates 200 are formed corresponding to the liquid crystal cells 1 in FIG. 13. FIG. 14 shows the mother counter substrate 2000 at a stage before forming the sealing materials 15 or the mother substrate sealing material 151 thereon. In FIG. 14, the alignment film 113 is formed on each of the counter substrates 200. Since the presence of the alignment film in a seal portion reduces the adhesive force of the sealing material 15, the alignment film 113 is formed so as to avoid the seal portion and cover a display region.

In FIG. 14, the alignment film 113 is formed by flexographic printing. After forming the alignment film 113, photo-alignment is performed on the alignment film 113 using polarized ultraviolet radiation. At this time, the entire surface of the mother counter substrate 2000 is irradiated with polarized ultraviolet radiation. This is because irradiation of the alignment films with polarized ultraviolet radiation one by one increases the manufacturing cost. Accordingly, also a portion where the alignment film is not formed is irradiated with polarized ultraviolet radiation.

FIG. 15 is a cross-sectional structure of one counter substrate 200 at an edge portion, showing a state of irradiation of polarized ultraviolet radiation for the photo-alignment. At the edge portion of the counter substrate 200, a light shielding film 202, a color filter 201, an overcoat film 203, and the like are formed as will be described later. The light shielding film 202 has a function to improve the contrast of a screen or to enhance the appearance of the screen periphery and is also referred to as black matrix. In the specification, however, the term "light shielding film" is used. As shown in FIG. 15, at a portion where the alignment film 113 is not present, a hatched portion 2031 of the overcoat film 203 is directly irradiated with ultraviolet radiation. Therefore, this portion 2031 of the overcoat film is degraded, whereby the overcoat film 203 allows moisture to easily penetrate.

FIG. 16 is a cross-sectional view of an edge portion of the counter substrate 200, showing a state where after performing the photo-alignment using polarized ultraviolet radiation, the sealing material 15 is formed. Since the hatched portion 2031 of the overcoat film 203 is degraded by ultraviolet radiation, moisture penetrates through this portion 2031 of the overcoat film to the surface of the light shielding film 202.

FIG. 17 is a cross-sectional view of an edge portion of a liquid crystal display panel in a state where the TFT substrate 100 and the counter substrate 200 are bonded together, and liquid crystal layer 300 is sealed therebetween. In FIG. 17, an inorganic passivation film 106, an organic passivation film 107, and the alignment film 113 are formed on the TFT substrate 100. The light shielding film 202, the color filter 201, the overcoat film 203, and the alignment film 113 are formed on the counter substrate 200. In FIG. 17, since the hatched portion 2031 of the overcoat film 203 of the counter substrate 200 is degraded by ultraviolet radiation in the photo-alignment, moisture easily enters this portion from the outside.

When moisture enters the degraded overcoat film 2031, the moisture reaches the light shielding film 202 and alters the light shielding film 202. Especially when moisture acts on the light shielding film 202, the adhesive force between the light shielding film 202 and the substrates 200 is reduced, which reduces the reliability in the seal portion. Moreover, when moisture acts on the light shielding film 202, the electrical resistance of the light shielding film 202 is reduced, an electric field in the liquid crystal layer 300 is disturbed by the influence of the light shielding film 202, and the contrast is reduced by light leakage.

SUMMARY OF THE INVENTION

It is an object of the invention to prevent moisture entering from the outside due to an overcoat film degraded by irradiation of ultraviolet radiation in photo-alignment from affecting a light shielding film.

To achieve the above-described object, the invention is specifically configured as follows.

(1) A liquid crystal display device includes: a TFT substrate having a display region where pixels each having a TFT and a pixel electrode are formed in a matrix; a counter substrate bonded to the TFT substrate with a sealing material in a seal portion at a periphery thereof and having a display region where a light shielding film and color filters of three colors are formed, an overcoat film is formed so as to cover the color filters of three colors, and an alignment film is formed so as to cover the overcoat film; and liquid crystal sealed between the TFT substrate and the counter substrate, wherein in the counter substrate, the alignment film is subjected to an alignment treatment by photo-alignment, and the alignment film is not formed in the seal portion; and in the seal portion of the counter substrate, the light shielding film, a color filter of one color among the color filters of three colors, and the overcoat film are stacked in this order, and the sealing material is formed on the overcoat film.

(2) A liquid crystal display device includes: a TFT substrate having a display region where pixels each having a TFT and a pixel electrode are formed in a matrix; a counter substrate bonded to the TFT substrate with a sealing material in a seal portion at a periphery thereof and having a display region where a light shielding film and color filters of three colors are formed, an overcoat film is formed so as to cover the color filters of three colors, and an alignment film is formed so as to cover the overcoat film; and liquid crystal sealed between the TFT substrate and the counter substrate, wherein in the counter substrate, the alignment film is subjected to an alignment treatment by photo-alignment, and the alignment film is not formed in the seal portion; and in the seal portion of the counter substrate, the light shielding film and color filters of a plurality of colors among the color filters of three colors are stacked, the overcoat film is formed so as to cover the stacked color filters, and the sealing material is formed on the overcoat film.

(3) The liquid crystal display device according to (2), wherein one of the plurality of color filters formed in the seal portion is formed continuously with the color filter formed in the display region, and the other color filters among the plurality of color filters are discontinuous with the color filters formed in the display region.

(4) A liquid crystal display device includes: a TFT substrate having a display region where pixels each having a TFT and a pixel electrode are formed in a matrix; a counter substrate bonded to the TFT substrate with a sealing material in a seal portion at a periphery thereof and having a display region where a light shielding film and color filters of three colors are formed, an overcoat film is formed so as to cover the color filters of three colors, and an alignment film is formed so as to cover the overcoat film; and liquid crystal sealed between the TFT substrate and the counter substrate, wherein in the counter substrate, the alignment film is subjected to an alignment treatment by photo-alignment, and the alignment film is not formed in the seal portion; in the seal portion of the counter substrate, the light shielding film, a color filter of one color among the color filters of three colors, and the overcoat film are stacked in this order; the color filter of one color formed in the seal portion is formed discontinuously with any of the color filters of three colors formed in the display region; a step is formed on the overcoat film corresponding to an edge of the color filter of one color formed in the seal portion; and the sealing material is formed on the overcoat film.

(5) A liquid crystal display device includes: a TFT substrate having a display region where pixels each having a TFT and a pixel electrode are formed in a matrix; a counter substrate bonded to the TFT substrate with a sealing material in a seal portion at a periphery thereof and having a display region where a light shielding film and color filters of three colors are formed, an overcoat film is formed so as to cover the color filters of three colors, and an alignment film is formed so as to cover the overcoat film; and liquid crystal sealed between the TFT substrate and the counter substrate, wherein in the counter substrate, the alignment film is subjected to an alignment treatment by photo-alignment, and the alignment film is not formed in the seal portion; in the seal portion of the counter substrate, the light shielding film and color filters of a plurality of colors among the color filters of three colors are stacked, and the overcoat film is formed so as to cover the stacked color filters; the plurality of color filters formed in the seal portion are formed discontinuously with any of the color filters of three colors formed in the display region; a step is formed on the overcoat film corresponding to an edge of the plurality of color filters formed in the seal portion; and the sealing material is formed on the overcoat film.

(6) A liquid crystal display device includes: a TFT substrate having a display region where pixels each having a TFT and a pixel electrode are formed in a matrix; a counter substrate bonded to the TFT substrate with a sealing material in a seal portion at a periphery thereof and having a display region where a light shielding film and color filters of three colors are formed, an overcoat film is formed so as to cover the color filters of three colors, and an alignment film is formed so as to cover the overcoat film; and liquid crystal sealed between the TFT substrate and the counter substrate, wherein in the counter substrate, the alignment film is subjected to an alignment treatment by photo-alignment, and the alignment film is not formed in the seal portion; in the seal portion of the counter substrate, the light shielding film and the overcoat film are stacked in this order; a thickness of the overcoat film at the seal portion is greater than that of the overcoat film at the display region; and the sealing material is formed on the overcoat film.

(7) The liquid crystal display device according to (6), wherein a thickness of the overcoat film at the seal portion is equal to or greater than 1.5 times that of the overcoat film at the display region.

According to an aspect of the invention, even when an overcoat film at a seal portion is degraded by ultraviolet radiation in photo-alignment, and moisture penetrates into the degraded overcoat film, the moisture can be blocked by a color filter disposed below the overcoat film and hardly reaches the light shielding film. Therefore, it is possible to prevent the peeling of the light shielding film. Moreover, since a reduction in electrical resistance of the light shielding film can be prevented, it is possible to prevent a reduction in contrast due to light leakage of a liquid crystal layer.

According to another aspect of the invention, since the overcoat film is formed thicker at the seal portion than at a display region, the overcoat film can be prevented from being entirely degraded by ultraviolet radiation in photo-alignment. Therefore, it is possible to prevent moisture from reaching the light shielding film. Moreover, since the overcoat film is not thick at the display region, it is possible to prevent a reduction in brightness of a display screen.

DETAILED DESCRIPTION OF THE INVENTION

Hereinafter, the contents of the invention will be described in detail based on embodiments.

First Embodiment

Figure 1:
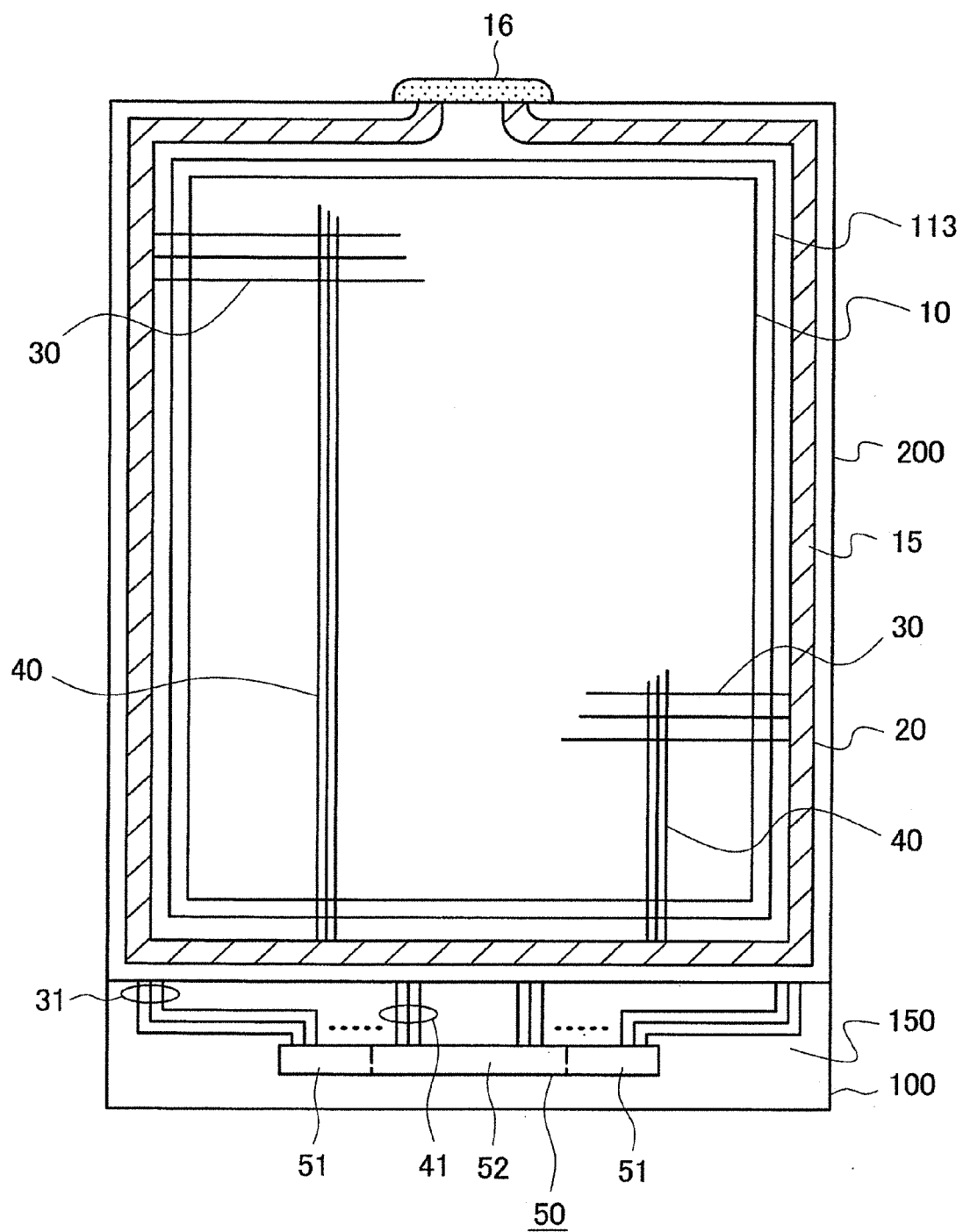
FIG. 1 is a plan view of a liquid crystal display device.

FIG. 1 is a plan view of a small liquid crystal display device used for mobile phones or the like as an example of a product to which the invention is applied. In FIG. 1, a counter substrate 200 is disposed above a TFT substrate 100. A liquid crystal layer is interposed between the TFT substrate 100 and the counter substrate 200. The TFT substrate 100 and the counter substrate 200 are bonded together with a sealing material 15 formed in a frame portion. In FIG. 1, a filling port is formed in the sealing material 15, and liquid crystal is filled through the filling port. Thereafter, the filling port is sealed with an end-sealing material 16.

The TFT substrate 100 is formed larger than the counter substrate 200. In a portion of the TFT substrate 100 extended from the counter substrate 200, a terminal portion 150 for supplying a power supply, video signals, scanning signals, and the like to a liquid crystal display panel is formed. In the terminal portion 150, an IC driver 50 for driving scanning lines, video signal lines, and the like is disposed. The IC driver 50 is divided into three regions. At the center of the IC driver, a video signal drive circuit 52 is disposed. A scanning signal drive circuit 51 is disposed on both sides of the center.

In a display region 10 of FIG. 1, scanning lines 30 extend in the horizontal direction and are arranged in the vertical direction. Moreover, video signal lines 40 extend in the vertical direction and are arranged in the horizontal direction. The scanning lines 30 are connected to the scanning signal drive circuit 51 of the IC driver 50 through scanning-line lead lines 31. In FIG. 1, for arranging the display region 10 at the center of the liquid crystal display device, the scanning-line lead lines 31 are arranged on both sides of the display region 10. Therefore, the scanning signal drive circuit 51 is disposed on both sides in the IC driver 50. On the other hand, video-signal-line lead lines 41 which connect the video signal lines 40 with the IC driver are collected on the lower side of a screen. The video-signal-line lead lines 41 are connected to the video signal drive circuit 52 arranged at the central portion of the IC driver 50.

An alignment film 113 is formed in a region slightly larger than the display region 10 in FIG. 1. Photo-alignment is performed on the alignment film 113. The alignment film 113 is not formed at a portion where the sealing material 15 is formed. This is because the presence of the alignment film 113 reduces the adhesive force between the sealing material 15 and the substrate.

Figure 2:
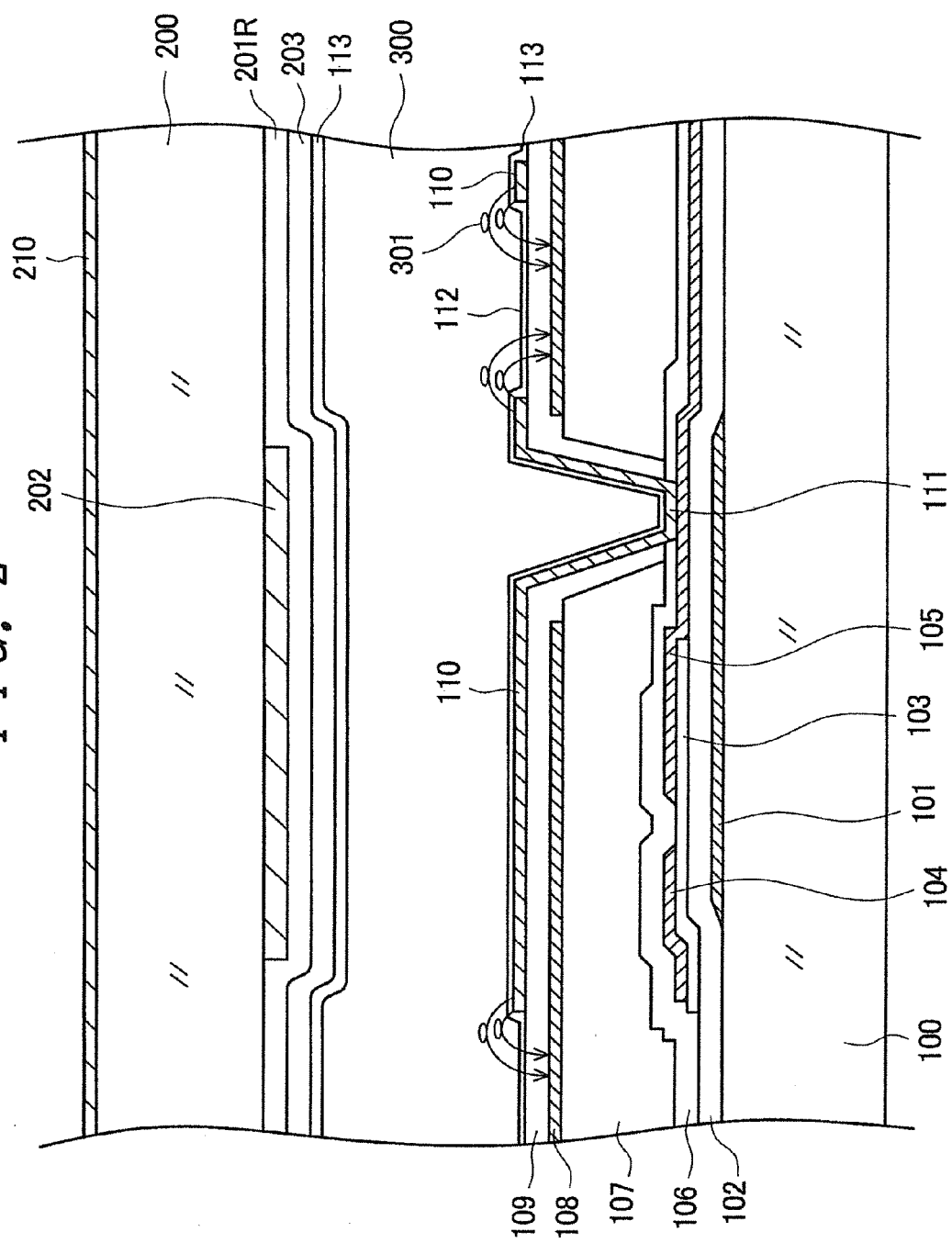
FIG. 2 is a cross-sectional view of a display region of the liquid crystal display device.

FIG. 2 is a cross-sectional view showing the structure of an IPS type liquid crystal display device in a display region. Various electrode structures of IPS type liquid crystal display devices have been proposed and put to practice use. The structure of FIG. 2 has been widely used at present. Briefly speaking, a pixel electrode 110 having a comb-teeth shape is formed above a counter electrode 108 which is formed in a planar and solid manner with an inter-layer insulating film 109 interposed therebetween. Liquid crystal molecules 301 are rotated by a voltage between the pixel electrode 110 and the counter electrode 108 to control the transmittance ratio of light in a liquid crystal layer 300 for each pixel, whereby an image is formed. The structure of FIG. 2 will be described in detail below. Although the invention is described by taking the configuration of FIG. 2 as an example, the invention can also be applied to IPS type liquid crystal display devices other than that of FIG. 2.

In FIG. 2, a gate electrode 101 is formed on the TFT substrate 100 formed of glass. The gate electrode 101 is formed in the same layer as the scanning lines. The gate electrode 101 includes an AlNd alloy layer and a MoCr alloy layer stacked in this order.

A gate insulating film 102 is formed of SiN so as to cover the gate electrode 101. A semiconductor layer 103 is formed of an a-Si film on the gate insulating film 102 at a position facing the gate electrode 101. The a-Si film is formed by plasma CVD. The a-Si film forms a channel portion of a TFT. A source electrode 104 and a drain electrode 105 are formed on the a-Si film with the channel portion interposed between the source electrode and the drain electrode. A not-shown n+Si layer is formed between the a-Si film and the source electrode 104 or the drain electrode 105 for establishing ohmic contact between the semiconductor layer and the source electrode 104 or the drain electrode 105.

The source electrode 104 is also used as the video signal line, and the drain electrode 105 is connected to the pixel electrode 110. The source electrode 104 and the drain electrode 105 are formed simultaneously in the same layer. In the embodiment, the source electrode 104 or the drain electrode 105 is formed of a MoCr alloy. For reducing the electrical resistance of the source electrode 104 or the drain electrode 105, an electrode structure having an AlNd alloy layer sandwiched between MoCr alloy layers is used.

An inorganic passivation film 106 is formed of SiN so as to cover the TFT. The inorganic passivation film 106 protects especially the channel portion of the TFT against impurities 401. An organic passivation film 107 is formed on the inorganic passivation film 106. Since the organic passivation film 107 functions to protect the TFT and planarize the surface of the TFT, the film is formed thick. The thickness thereof is from 1 μm to 4 μm.

The counter electrode 108 is formed on the organic passivation film 107. The counter electrode 108 is formed by sputtering an indium tin oxide (ITO) film as a transparent conductive film over the entire display region. That is, the counter electrode 108 is formed in a planar manner. After the counter electrode 108 is formed by sputtering over the entire surface, only a through hole 111 portion for establishing electrical continuity between the pixel electrode 110 and the drain electrode 105 is formed by removing the counter electrode 108 by etching.

An inter-layer insulating film 109 is formed of SiN so as to cover the counter electrode 108. After forming the inter-layer insulating film 109, the through hole 111 is formed. Thereafter, an ITO film serving as the pixel electrode 110 is deposited so as to cover the inter-layer insulating film 109 and the through hole 111. The deposited ITO film is patterned to form the pixel electrode 110. The ITO film serving as the pixel electrode 110 is also deposited on the through hole 111. In the through hole 111, the drain electrode 105 extended from the TFT and the pixel electrode 110 are electrically conducted, so that a video signal is supplied to the pixel electrode 110.

The pixel electrode is a so-called comb-teeth shaped electrode. A slit 112 shown in FIG. 2 is formed between electrodes each having a comb-tooth shape. A fixed voltage is applied to the counter electrode 108, and a voltage due to a video signal is applied to the pixel electrode 110. As shown in 2, when the voltage is applied to the pixel electrode 110, lines of electric force are generated to rotate the liquid crystal molecules 301 in a direction of the lines of electric force, whereby the transmission of light from a backlight is controlled. The transmission of light from the backlight is controlled for each pixel, whereby an image is formed. The alignment film 113 on the TFT substrate side is formed on the pixel electrode 110 to align the liquid crystal molecules 301. Photo-alignment using polarized ultraviolet radiation is employed as an alignment treatment for the alignment film.

In the example shown in FIG. 2, the counter electrode 108 formed in a planar manner is disposed on the organic passivation film 107, and the comb-teeth electrode 110 is disposed on the inter-layer insulating film 109. Contrary to this, however, the pixel electrode 110 formed in a planar manner may be disposed on the organic passivation film 107, and the counter electrode 108 having a comb-teeth shape may be disposed on the inter-layer insulating film 109.

In FIG. 2, the counter substrate 200 is disposed with the liquid crystal layer 300 interposed between the counter substrate 200 and the TFT substrate 100. Color filters are formed on the inner side of the counter substrate 200. In FIG. 2, a red color filter 201R is formed. A light shielding film 202 is formed below the color filter at a region where an image is not formed. The light shielding film 202 improves the contrast of image and also functions as the light shielding film of the TFT for preventing photocurrent from flowing into the TFT.

An overcoat film 203 is formed so as to cover the red color filter 201R and the light shielding film 202. Since the surface of the red color filter 201R and the light shielding film 202 has irregularities, the surface is planarized by the overcoat film 203. An alignment film 113 for determining the initial alignment of liquid crystal is formed on the overcoat film 203. The alignment film 113 is subjected to the photo-alignment treatment.

Since FIG. 2 shows the IPS type liquid crystal display device, the counter electrode 108 is formed on the TFT substrate 100 side but not formed on the counter substrate 200 side. In the IPS type as described above, a conductive film is not formed on the inner side of the counter substrate 200. Therefore, the potential of the counter substrate 200 becomes unstable. Moreover, electromagnetic noise from the outside enters the liquid crystal layer 300 to exert an influence on an image. For eliminating the problems, a surface conductive film 210 is formed on the outer surface of the counter substrate 200. The surface conductive film 210 is formed by sputtering an ITO film as a transparent conductive film.

Figure 3:
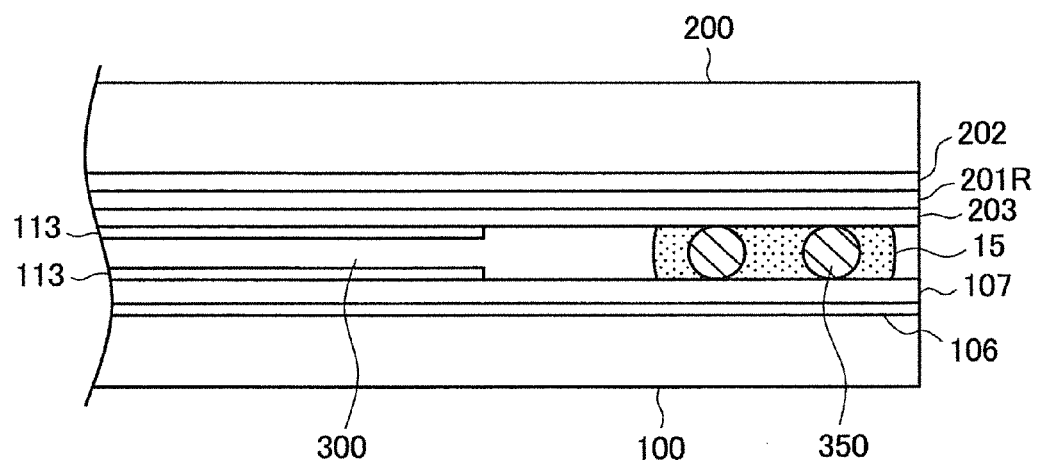
FIG. 3 is a cross-sectional view of a seal portion of a liquid crystal display device according to a first embodiment.

FIG. 3 is a cross-sectional view of the liquid crystal display device at an edge portion shown in FIG. 1. In FIG. 3, the inorganic passivation film 106, the organic passivation film 107, and the alignment film 113 are formed on the TFT substrate 100. The other configurations of the TFT substrate 100 are not illustrated in FIG. 3. The light shielding film 202, the red color filter 201R, the overcoat film 203, and the alignment film 113 are formed on the counter substrate 200. The edge portion is sealed with the sealing material 15, and the gap between the TFT substrate 100 and the counter substrate 200 is defined by spacers 350 made of glass fibers.

In FIG. 3, the alignment film 113 is subjected to the alignment treatment by photo-alignment. A feature of the invention shown in FIG. 3 is in that the red color filter 201R is disposed below the overcoat film 203 at the edge portion. While the red color filter 201R is formed in FIG. 3, a green color filter or a blue color filter may be formed. In the counter substrate 200 of FIG. 3, the overcoat film 203 at a portion where the alignment film 113 is not present is degraded by ultraviolet radiation in photo-alignment, and therefore is in a state where moisture easily enters the portion.

Even when the overcoat film 203 is degraded by ultraviolet radiation, the red color filter 201R is present below the overcoat film 203. Accordingly, the moisture entering the overcoat film 203 is blocked by the red color filter 201R and does not reach the light shielding film 202 situated below the overcoat film 203, or it takes long time for the moisture to reach the light shielding film 202. Accordingly, it is possible to prevent a reduction in adhesive force or a reduction in electrical resistance of the light shielding film 202 due to reaction of the light shielding film 202 with moisture.

Figure 4:
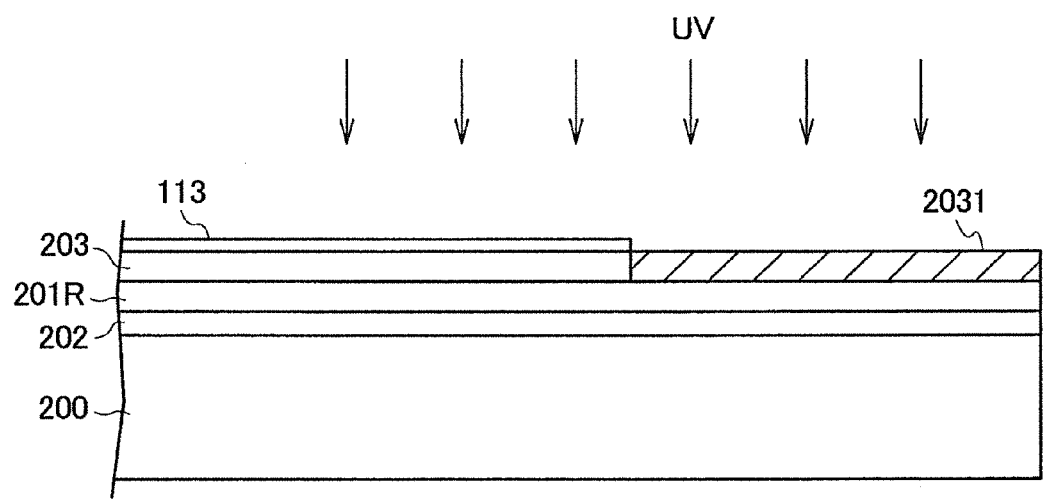
FIG. 4 is a cross-sectional view of a counter substrate in photo-alignment.
Figure 5:
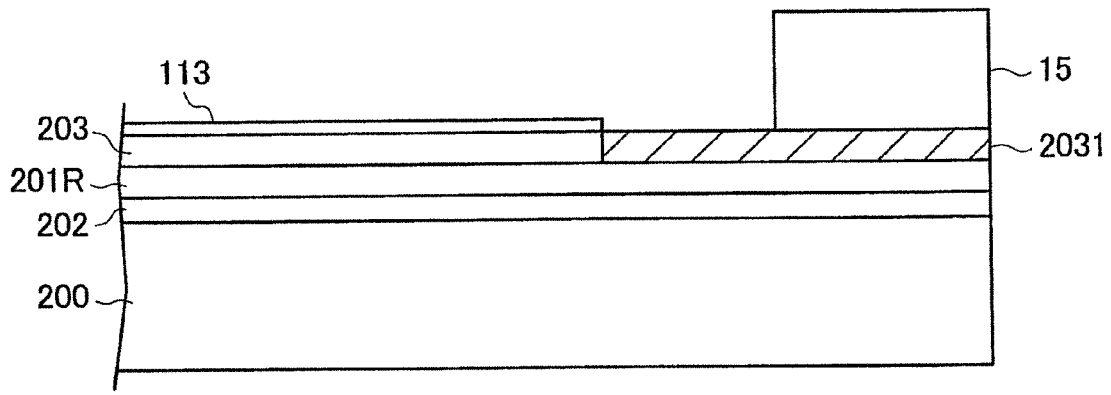
FIG. 5 is a cross-sectional view of a counter substrate according to the first embodiment.

FIGS. 4 and 5 illustrate the above description. FIG. 4 shows a state where the light shielding film 202, the red color filter 201R, the overcoat film 203, and the alignment film 113 are formed in this order on the counter substrate 200. The light shielding film 202 has a thickness of about 1 μm. The red color filter 201R has a thickness of from 1 to 2 μm. The overcoat film 203 has a thickness of 1 to 2 μm. The alignment film 113 has a thickness of about 0.1 μm. The green color filter, the blue color filter, and the like have also a thickness of from 1 to 2 μm.

The alignment film 113 is not formed at the edge portion. This is for preventing a reduction in adhesive force of the sealing material 15 due to the alignment film 113. In FIG. 4, the alignment film 113 is irradiated with ultraviolet radiation UV for applying the alignment treatment. The alignment film 113 is subjected to the alignment treatment with ultraviolet radiation, but a hatched overcoat film 2031 at the edge portion where the alignment film 113 is not present is degraded by the ultraviolet radiation.

Thereafter, as shown in FIG. 5, the sealing material 15 is formed on the overcoat film 203 at the edge portion where the alignment film 113 is not present. In FIG. 5, moisture easily penetrates into the hatched portion 2031 of the overcoat film degraded by the ultraviolet radiation. However, since the red color filter 201R is present below the hatched overcoat film 2031, the penetrated moisture is blocked by the red color filter 201R and does not easily reach the light shielding film 202. Accordingly, the reliability of the seal portion can be assured.

In the related art, a color filter is formed only in a display region. In the invention, however, a color filter is extended up to the edge portion of the counter substrate 200. The color filter is formed by photolithography. That is, the forming range of the color filter can be defined by an exposure mask. Accordingly, even when the color filter is formed up to the edge portion of the counter substrate, the number of processes does not increase.

According to the embodiment as described above, even when the overcoat film 203 is degraded by ultraviolet radiation in the photo-alignment treatment, the influence of moisture penetrating through the overcoat film 203 is blocked by the color filter. Therefore, the reliability of the seal portion is not reduced. Moreover, it is also possible to prevent a reduction in electrical resistance of the light shielding film 202 caused by reaction of moisture with the light shielding film 202. Therefore, a reduction in contrast due to light leakage of liquid crystal can be prevented.

In the above embodiment, although a color filter formed in the seal portion is the red color filter 201R, this is illustrative only. Another color filter, that is, a green color filter or a blue color filter may be formed.

Second Embodiment

Figure 6:
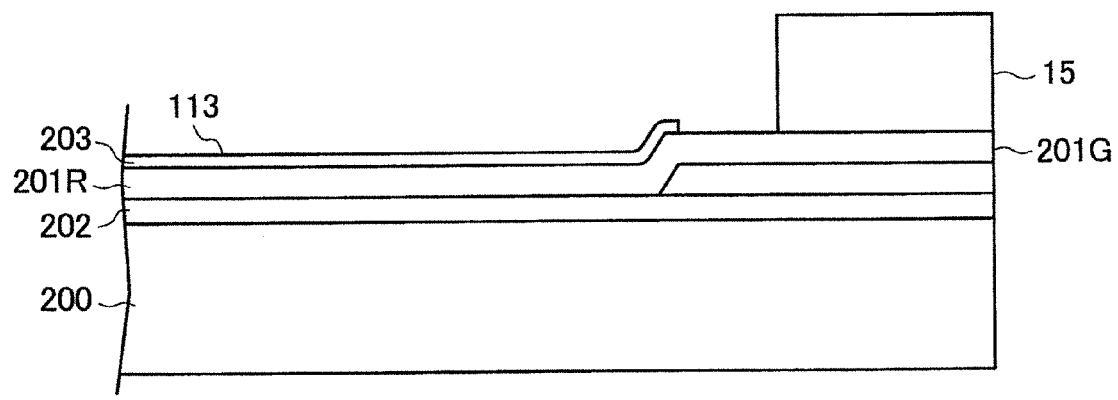
FIG. 6 is a cross-sectional view of a counter substrate according to a second embodiment.

FIG. 6 is a cross-sectional view of the counter substrate 200 in the vicinity of an edge portion according to a second embodiment of the invention. In FIG. 6, the light shielding film 202, the red color filter 201R, the overcoat film 203, and the alignment film 113 are formed in this order on the counter substrate 200. However, the red color filter 201R and a green color filter 201G are stacked in a seal portion where the alignment film 113 is not present. The alignment film 113 is subjected to the photo-alignment treatment. Accordingly, the overcoat film 203 at the portion where the alignment film 113 is not present is degraded by ultraviolet radiation.

In FIG. 6, two layers of color filters of the green color filter 201G and the red color filter 201R are formed below the overcoat film 203 degraded by ultraviolet radiation. Accordingly, even when moisture penetrates into the degraded overcoat film 203, the penetrated moisture is blocked by the green color filter 201G and the red color filter 201R and does not reach the light shielding film 202.

In the configuration of FIG. 6, since the two layers of the color filters are formed in the seal portion, a protective effect against moisture is greater than that of the configuration of the first embodiment. The respective layers have the same thicknesses as those of the first embodiment. That is, both the green color filter and the red color filter are formed to have a thickness of from 1 to 2 μm in the same manner as in the first embodiment.

Another effect of the configuration of FIG. 6 is in that the entering of the alignment film 113 into the seal portion can be prevented when the alignment film 113 is applied. As shown in FIG. 6, since the green color filter 201G is formed in the vicinity of the edge portion, a step is produced on the overcoat film 203. The step functions as a stopper against the alignment film 113 flowing from the display region.

The alignment film 113 has fluidity when applied because it is liquid, and therefore it is hard to accurately define the applying area. Especially the presence of the alignment film 113 below the sealing material 15 reduces the adhesive force of the sealing material 15. In the embodiment, as shown in FIG. 6, since the range of the alignment film 113 can be defined by forming the step with the green color filter 201G, the reliability in the seal portion can be maintained at a high level. Since the green color filter 201G formed at the periphery is formed by photolithography, accurate dimension can be maintained. The step has a height of about from 1 to 2 μm, which is the thickness of the green color filter.

Figure 7:
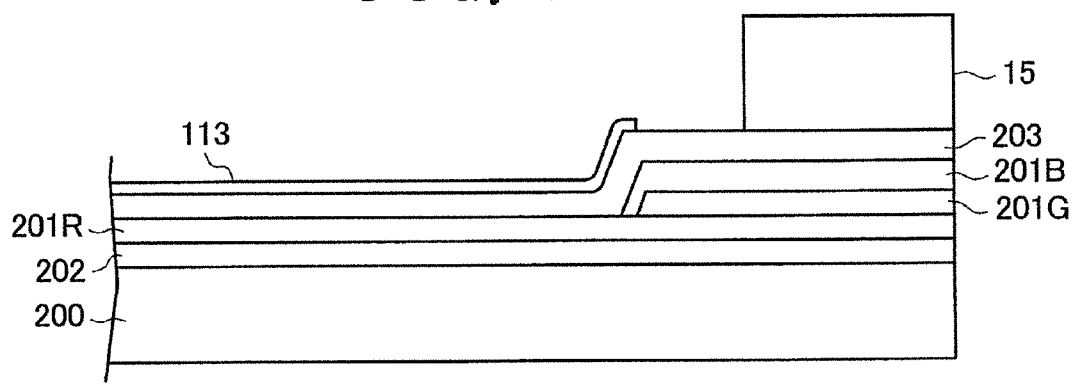
FIG. 7 is a cross-sectional view of a counter substrate according to another aspect of the second embodiment.

FIG. 7 shows another aspect in the embodiment. A display region on the left of FIG. 7 is similar to that described with reference to FIG. 6, but an edge portion is different from that of FIG. 6. Between the light shielding film 202 and the overcoat film 203, three layers of color filters of the red color filter 201R, the green color filter 201G, and a blue color filter 201B are formed in this order. The alignment film 113 is subjected to the photo-alignment treatment in the same manner as in the first embodiment or in FIG. 6.

In FIG. 7, the overcoat film 203 at a portion not covered with the alignment film 113 is degraded by ultraviolet radiation in photo-alignment in the same manner as in the first embodiment. In the embodiment, since the three layers of the color filters are present until moisture penetrating through the degraded overcoat film 203 reaches the light shielding film 202, the reliability of the seal portion can be further improved more than that of FIG. 6.

As shown in FIG. 7, a step is formed with two layers of color filters of the green color filter 201G and the blue color filter 201B in the vicinity of the seal portion. Therefore, the forming range of the alignment film 113 can be defined by the step. In the embodiment, the step is formed with the two layers of the color filters, and the step can be formed to have a height of from 2 µm to about 4 µm. Therefore, the applying range of the alignment film can be defined more reliably.

In the embodiment, although the red color filter 201R and the green color filter 201G are sequentially stacked in FIG. 6, two layers of color filters are not limited to those color filters. Other color filters may be stacked, and the order of stacking may be different. Also in FIG. 7, although the color filters are stacked in the order of the red color filter 201R, the green color filter 201G, and the blue color filter 201B, the stacking order of color filters is not limited to this but can be arbitrarily determined depending on the manufacturing conditions of color filter.

Third Embodiment

Figure 8:
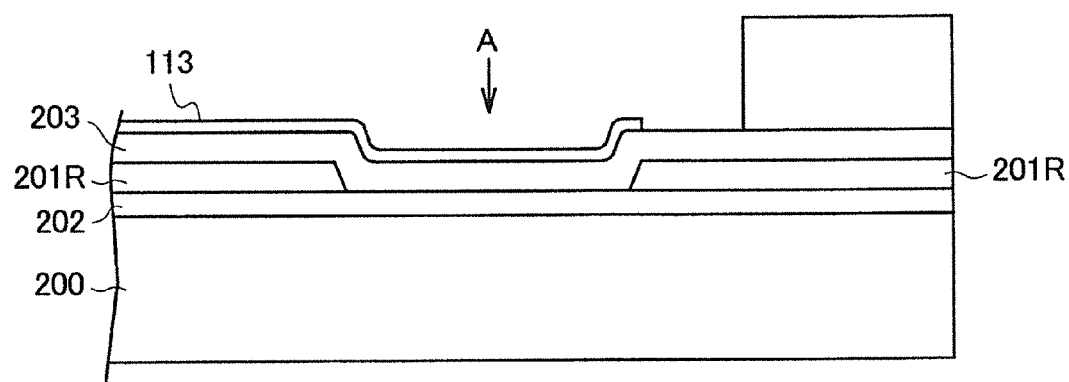
FIG. 8 is a cross-sectional view of a counter substrate according to a third embodiment.

FIG. 8 is a cross-sectional view of the counter substrate 200 in the vicinity of an edge portion according to a third embodiment. In FIG. 8, the light shielding film 202, the red color filter 201R, the overcoat film 203, and the alignment film 113 are formed in this order on the counter substrate 200. The alignment film 113 is subjected to the photo-alignment treatment. Accordingly, the overcoat film 203 at a portion not covered with the alignment film 113 is degraded by ultraviolet radiation in photo-alignment.

The red color filter 201R is disposed between the overcoat film 203 degraded by ultraviolet radiation and the light shielding film 202 to thereby block moisture penetrating through the degraded overcoat film 203 by the red color filter 201R in the same manner as in the first embodiment. Different from the first embodiment, the red color filter 201R is not continuously formed to the edge portion in the embodiment. Instead, a region formed by removing the red color filter, that is, a portion A in FIG. 8 is disposed between the display region and the seal portion.

Due to the presence of the portion A, even when only one layer of the red color filter is formed in the seal portion, a step is formed for the alignment film 113, and therefore the step can be used as a stopper against the spreading of the alignment film. Moreover, the portion A acts as a so-called liquid pool for the alignment film 113 and can reliably prevent the spreading of the alignment film 113 to the outside together with the step.

In the embodiment, although a color filter formed in the seal portion is the red color filter 201R, this is illustrative only. Another color filter, that is, the green color filter 201G or the blue color filter 201B may be formed.

Fourth Embodiment

Figure 9:
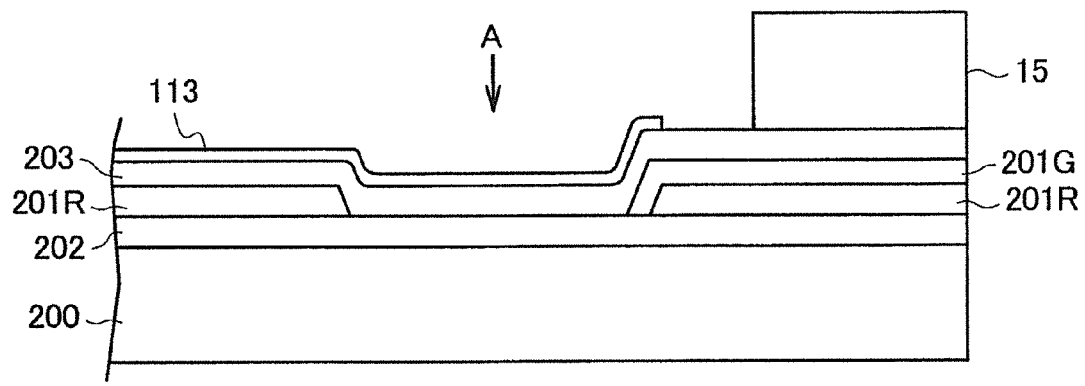
FIG. 9 is a cross-sectional view of a counter substrate according to a fourth embodiment.

FIG. 9 is a cross-sectional view of the counter substrate 200 in the vicinity of an edge portion according to a fourth embodiment. In FIG. 9, the light shielding film 202, the red color filter 201R, the overcoat film 203, and the alignment film 113 are formed in this order on the counter substrate 200. However, the red color filter 201R and the green color filter 201G are present between the overcoat film 203 and the light shielding film 202 in the seal portion. The alignment film 113 is subjected to the photo-alignment treatment. Accordingly, the overcoat film 203 at a portion not covered with the alignment film 113 is degraded by ultraviolet radiation in photo-alignment.

The red color filter 201R and the green color filter 201G are disposed between the overcoat film 203 degraded by ultraviolet radiation and the light shielding film to thereby block moisture penetrating through the degraded overcoat film 203 in the same manner as in FIG. 6 of the second embodiment. Different from FIG. 6, the red color filter 201R is not continuously formed to the edge portion in the embodiment. Instead, a region formed by removing the red color filter 201R, that is, the portion A in FIG. 9 is disposed between the display region and the seal portion.

Due to the presence of the portion A, a step formed in the vicinity of the seal portion corresponds to two layers of the red color filter 201R and the green color filter 201G, and the height of the step can be increased to from 2 µm to 4 µm. Accordingly, the alignment film 113 spreading to the outside can be regulated more effectively. Moreover, the portion A acts as a so-called liquid pool for the alignment film 113 and can more reliably prevent the spreading of the alignment film 113 to the outside together with the step.

Figure 10:
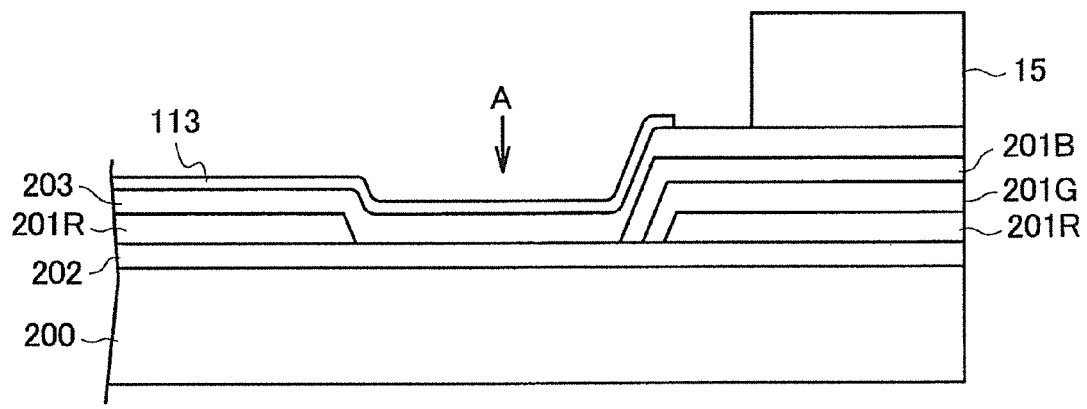
FIG. 10 is a cross-sectional view of a counter substrate according to another aspect of the fourth embodiment.

FIG. 10 is a cross-sectional view of the counter substrate 200 in the vicinity of an edge portion according to another aspect of the fourth embodiment. The configuration of FIG. 10 is the same as that of FIG. 9 except that three layers of color filters of the red color filter 201R, the green color filter 201G, and the blue color filter 201B are present between the overcoat film 203 and the light shielding film 202 in the seal portion.

In the configuration of FIG. 10, the red color filter 201R, the green color filter 201G, and the blue color filter 201B are disposed between the overcoat film 203 degraded by ultraviolet radiation in photo-alignment and the light shielding film 202 to thereby block moisture penetrating through the degraded overcoat film 203 in the same manner as in FIG. 7 of the second embodiment. Different from FIG. 7, the red color filter 201R is not continuously formed to the edge portion in the embodiment. Instead, a region formed by removing the red color filter 201R, that is, the portion A in FIG. 10 is disposed between the display region and the seal portion.

Due to the presence of the portion A, a step formed in the vicinity of the seal portion corresponds to three layers of the red color filter 201R, the green color filter 201G, and the blue color filter 201B, and therefore the alignment film 113 spreading to the outside can be regulated more effectively. Since the step corresponds to three layers, the height of the step can be increased to from 3 µm to about 6 µm. Therefore, even when the viscosity of the alignment film 113 is low, the step can sufficiently function as a stopper. Moreover, the portion A acts as a so-called liquid pool for the alignment film 113 and can more reliably prevent the spreading of the alignment film 113 to the outside together with the step.

In the embodiment as described above, it is possible to more reliably prevent the influence of moisture penetrating through the degraded overcoat film 203 than the case of the third embodiment. Moreover, according to the configuration of the embodiment, the outer shape of the alignment film 113 can be more reliably defined.

In the embodiment, although the red color filter 201R and the green color filter 201G are sequentially stacked in FIG. 9, two layers of color filters are not limited to those filters. Other color filters may be stacked, and the stacking order may also be different. In FIG. 10, although color filters are stacked in the order of the red color filter, the green color filter, and the blue color filter, the stacking order of color filters is not limited to this. The order can be arbitrarily determined depending on the manufacturing conditions of color filter.

Fifth Embodiment

Figure 11:
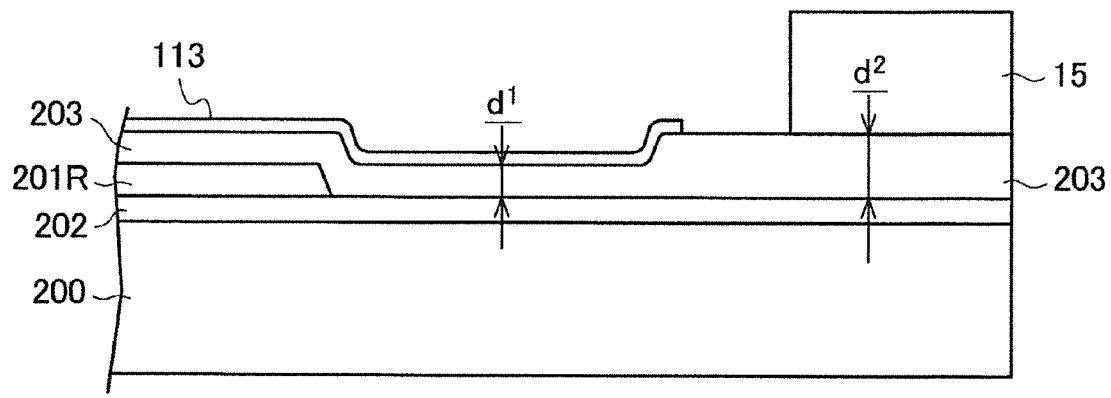
FIG. 11 is a cross-sectional view of a counter substrate according to a fifth embodiment.

FIG. 11 is a cross-sectional view of the counter substrate 200 in the vicinity of an edge portion according to a fifth embodiment of the invention. In FIG. 11, the light shielding film 202, the red color filter 201R, the overcoat film 203, and the alignment film 113 are formed in this order on the counter substrate 200. In a seal portion, however, the light shielding film 202 and the overcoat film 203 are formed on the counter substrate 200, and the sealing material 15 is formed on the overcoat film 203. In FIG. 11, a color filter is not formed in the seal portion.

Also in the embodiment, the alignment film 113 is subjected to the photo-alignment treatment. Accordingly, the overcoat film 203 at a portion where the alignment film 113 is not present is degraded by ultraviolet radiation in photo-alignment. Moisture penetrates from the degraded portion of the overcoat film in the same manner as in the first to fourth embodiments.

A feature of the embodiment is in that a thickness of the overcoat film 203 is greater at the seal portion than at a display region. In FIG. 11, the overcoat film 203 has a thickness of d2 at the seal portion and has a thickness of d1 at the display region. As a ratio between the thickness d1 at the display region and the thickness d2 at the seal portion of the overcoat film 203, the thickness d2 is preferably equal to or greater than twice the thickness d1. However, the effect can be provided even when the thickness d2 is equal to or greater than 1.5 times the thickness d1. In the case where the thickness d2 is twice the thickness d1, when the thickness d1 at the display region is from 1 to 2 µm, the thickness d2 is from 2 to 4 µm. An increase in thickness of the overcoat film 203 at the display region reduces the transmittance ratio of light, which reduces the brightness of a screen. Therefore, the thickness d1 of the overcoat film 203 at the display region must be limited to from 1 to 2 µm.

The overcoat film 203 not covered with the alignment film 113 is degraded by ultraviolet radiation in photo-alignment. However, a region in the vicinity of the surface is mainly degraded by ultraviolet radiation, and ultraviolet radiation does not largely affect a depth portion of the film. In the embodiment, the overcoat film 203 is increased in thickness at the portion directly irradiated with ultraviolet radiation, so that the depth portion of the overcoat film 203 is not damaged by ultraviolet radiation.

Accordingly, even in case the surface of the overcoat film 203 is damaged by ultraviolet radiation to allow moisture to penetrate therethrough, the moisture is blocked at the depth portion of the overcoat film 203 and does not reach the light shielding film 202 because the depth portion of the overcoat film 203 is not damaged. Accordingly, it is possible to prevent such a phenomenon that moisture reacts with the light shielding film 202 to cause peeling of the light shielding film 202 or reduce the electrical resistance of the light shielding film 202.

As a method for forming the light shielding film 202 having an increased thickness only at the periphery, a half exposure technique can be used. In the case of using a positive photo-sensitive material for the overcoat film 203 for example, since the exposed portion is dissolved in a developer, such an exposure mask that the exposure amount of the overcoat film is reduced at the seal portion is used. Therefore, the thickness of the overcoat film can be increased only at the seal portion.

Also in the embodiment, since a step is formed between a thin portion and a thick portion of the overcoat film 203, the step can be used as a stopper of the alignment film 113. The step formed in this case is from 1 µm to 2 µm. Moreover, since a recessed portion formed between the edge of the red color filter 201R and the step portion of the overcoat film 203 can function as a liquid pool of the alignment film 113, the recessed portion can contribute to define the outer shape of the alignment film 113 together with the step of the overcoat film 203.

Figure 12:
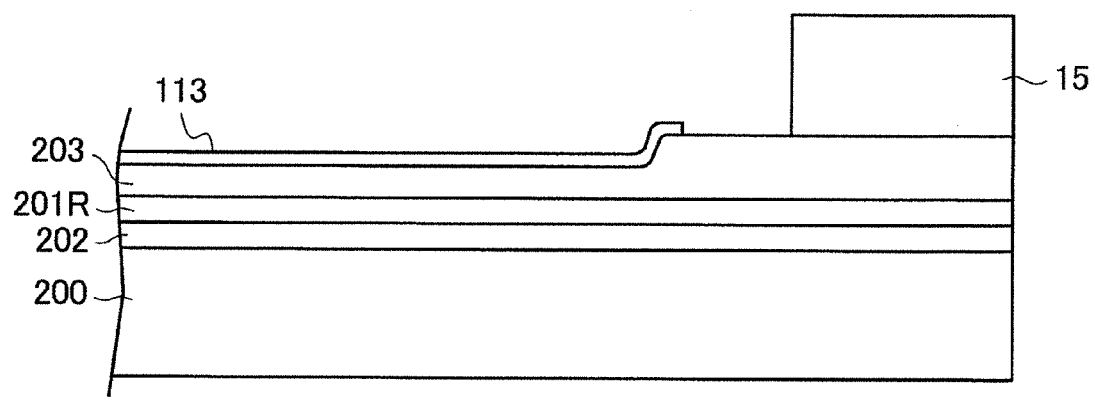
FIG. 12 is a cross-sectional view of a counter substrate according to another aspect of the fifth embodiment.
Figure 13:
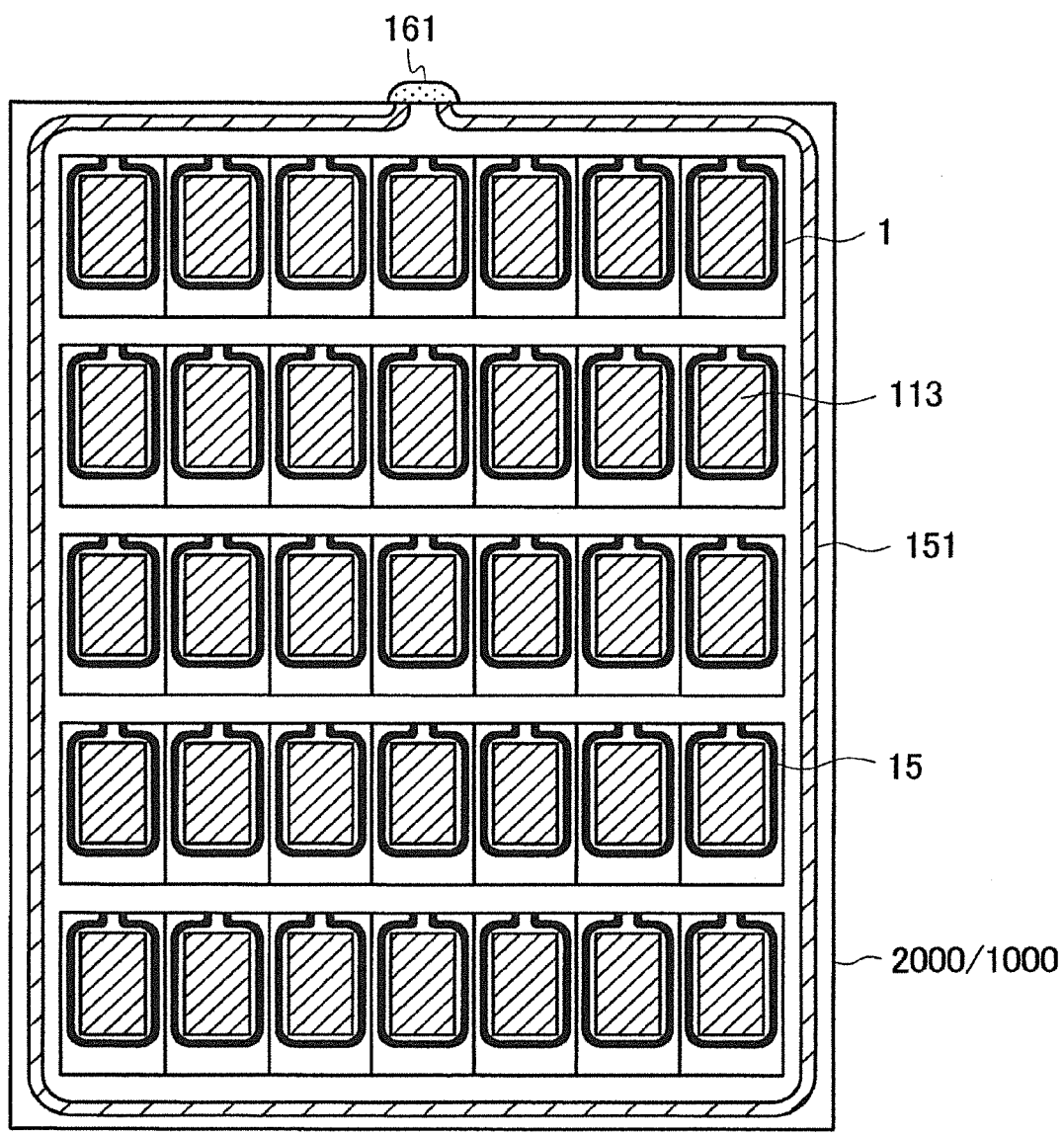
FIG. 13 is a plan view of a mother substrate.
Figure 14:
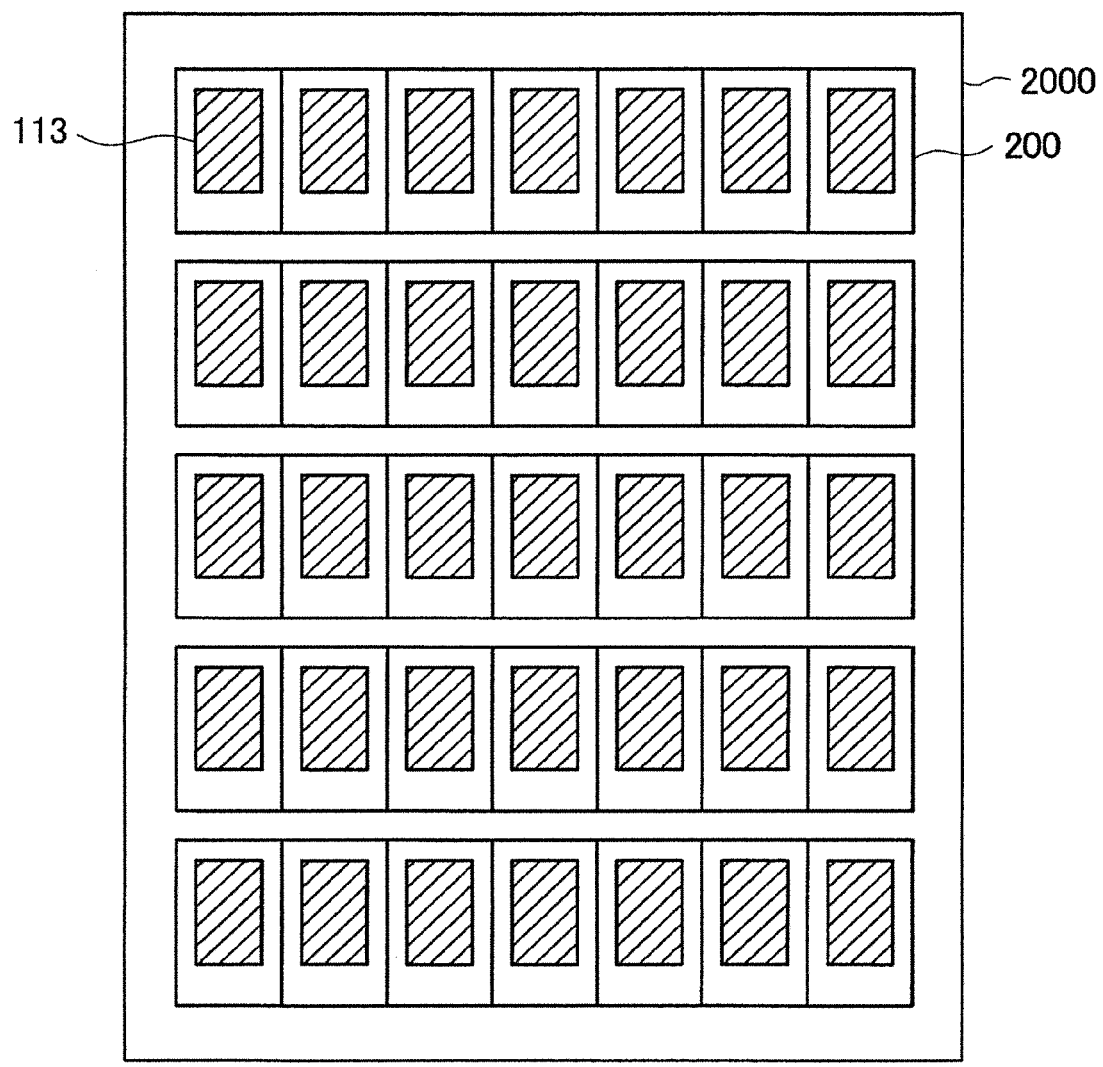
FIG. 14 is a plan view of a mother counter substrate.
Figure 15:
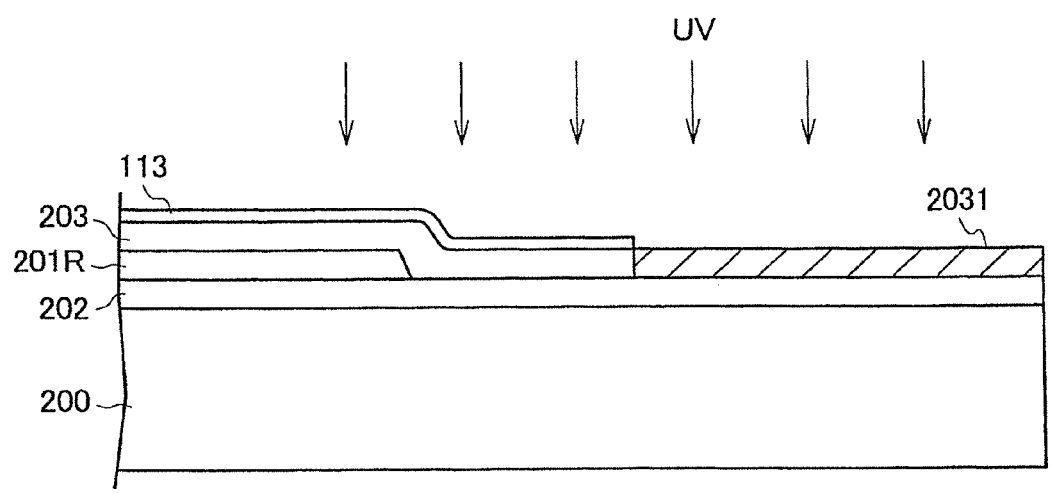
FIG. 15 is a cross-sectional view of a counter substrate in photo-alignment in the related art.
Figure 16:
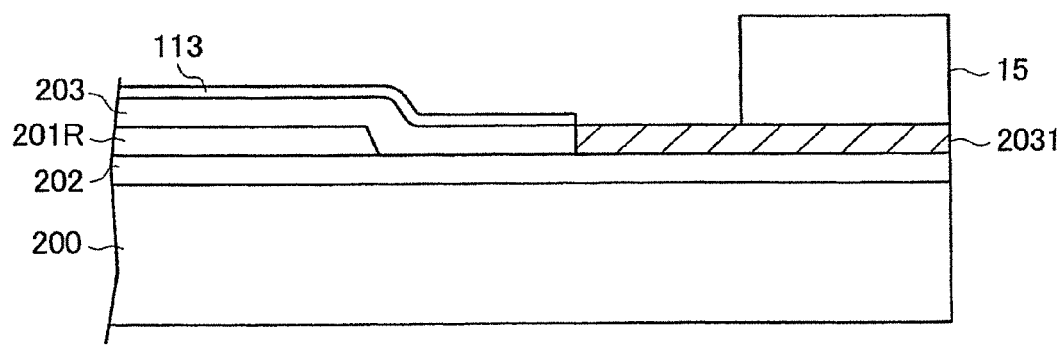
FIG. 16 is a cross-sectional view of the counter substrate in a state where a sealing material is formed in the related art.
Figure 17:
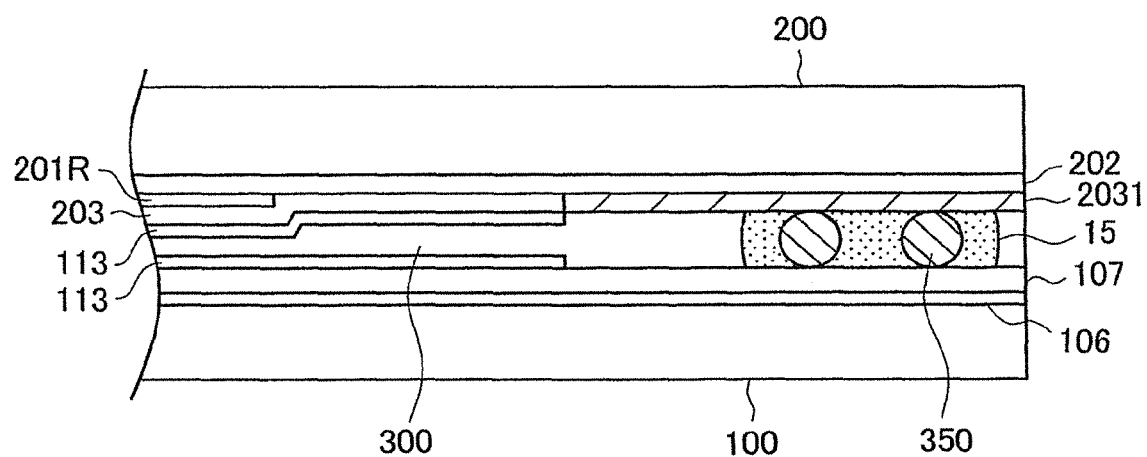
FIG. 17 is a cross-sectional view of an edge portion of a liquid crystal display device in the related art.

FIG. 12 is a modified example of the embodiment, which is a combination of the embodiment and the configuration of the first embodiment. That is, the thickness of the overcoat film 203 is greater at a seal portion than at a display region, and the red color filter 201R is disposed below the overcoat film 203. With this configuration, the effect of protecting the light shielding film 202 against the influence of moisture penetrating into the surface of the overcoat film 203 degraded by ultraviolet radiation can be assured more reliably.

FIG. 12 shows the example of the combination of the fifth embodiment and the first embodiment, but the fifth embodiment can be combined with the second to fourth embodiments. When the fifth embodiment is combined with the second to fourth embodiments, the height of the step acting as a stopper of the alignment film 113 can be increased more, making it possible to use an alignment film having a low viscosity.

Examples of forming methods of the alignment film 113 include, in addition to flexographic printing, an inkjet method. When an alignment film is formed by an inkjet method, the viscosity of the alignment film must be low. When the viscosity of the alignment film is low, the alignment film is likely to spread to the periphery, making it hard to accurately define the forming range of the alignment film. In such a case, when the invention described in and after the second embodiment is used, a step is formed on the overcoat film 203, and therefore the spreading of the alignment film to the outside can be prevented. That is, since the use of the invention makes it possible to apply an alignment film having a low viscosity, the choice of forming processes of the alignment film can be widened.

In the above-described embodiment, although the color filter formed in the seal region is formed up to the edge of the counter substrate, the color filter may be terminated stepwise in front of the edge of the counter substrate. With this configuration, the peeling of the color filter or the like at the edge of the substrate can be prevented. Moreover, instead of forming the color filter in the entire seal region, a part of the color filter can be removed in the seal region. The removed portion may have an island shape or a narrow stripe shape parallel to a side of the substrate. With this configuration, a region where the overcoat film is in contact with the light shielding film is formed in the part of the seal region. Moreover, the presence of a step portion of the color filter in the seal portion increases the contact area of the sealing material, making it possible to enhance the adhesive strength between the sealing material and the counter substrate. Therefore, the reliability of the seal portion is improved.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
    a first substrate;
    a second substrate;
    a sealing material fixing the first substrate and the second substrate;
    a liquid crystal layer sealed between the first substrate and the second substrate;
    a plurality of TFTs, a plurality of pixel electrodes, and a first alignment film which are formed on the first substrate; and
    a light shielding film, a first color filter, an overcoat film covering the first color filter,
    and a second alignment film disposed between the overcoat film and the liquid crystal layer, wherein the second alignment film is a photo alignment film that has experienced an irradiation with UV light, wherein the overcoat film has a first region covered by the second alignment film, and a second region not covered by the second alignment film, wherein the light shielding film, the first color filter, and the overcoat film are stacked between the sealing material and the second substrate in the second region, wherein the sealing material is in direct contact with the overcoat film in the second region, and wherein the second region of the overcoat film is more degraded by the irradiation with UV light than the first region of the overcoat film.

2. The liquid crystal display device according to claim 1, further comprising a counter electrode formed on the first substrate, and wherein the liquid crystal layer is controlled by an electric field generated between the plurality of pixel electrodes and the counter electrode.

3. The liquid crystal display device according to claim 2, wherein the first alignment film is a photo alignment film.

4. The liquid crystal display device according to claim 1, wherein, the first color filter is configured to prevent moisture entering the second region of the overcoat film from reaching the light shielding film.

5. The liquid crystal display device according to claim 1, wherein the first alignment film is a photo alignment film.

6. The liquid crystal display device according to claim 5, wherein, the first color filter is configured to prevent moisture entering the second region of the overcoat film from reaching the light shielding film.

7. The liquid crystal display device according to claim 1, further comprising a second color filer disposed between the overcoat film and the second substrate, and wherein the light shielding film, the first color filter, the second color filter, and the overcoat film are stacked between the sealing material and the second substrate in the second region.

8. The liquid crystal display device according to claim 7, wherein the first alignment film is a photo alignment film that has experienced the irradiation with UV light.

9. The liquid crystal display device according to claim 8, wherein the sealing material is in direct contact with the overcoat film in the second region.

10. The liquid crystal display device according to claim 7, further comprising a counter electrode formed on the first substrate, and wherein the liquid crystal layer is controlled by an electric field generated between the plurality of pixel electrodes and the counter electrode.

11. The liquid crystal display device according to claim 10, wherein the first alignment film is a photo alignment film.

12. The liquid crystal display device according to claim 1,
scanning lines and video signal lines to drive TFTs are formed in a display area and in a peripheral seal area where the sealing material is formed on the first substrate,
wherein the scanning lines and the video signal lines are not formed in a peripheral seal area of the second substrate.

13. The liquid crystal display device according to claim 1,
wherein a second color filter of one layer is formed in a display area of the second substrate,
the first color filter is of two layers or more, and
wherein there exists an area where no color filter is formed between the first color filter and the second color filter.

* * * * *